United States Patent
Liedloff et al.

(10) Patent No.: US 7,348,046 B2
(45) Date of Patent: Mar. 25, 2008

(54) POLYMER MIXTURE OF ALIPHATIC POLYAMIDES AND PARTIALLY AROMATIC POLYAMIDES, MOULDED ARTICLES THEREOF AND USE THEREOF

(75) Inventors: Hanns-Jörg Liedloff, Domat/Ems (CH); Eduard Schmid, Bonaduz (CH); Reinhard Hans Hagen, Domat/Ems (CH)

(73) Assignee: EMS-Chemie AG, Domat/EMS (CH)

( * ) Notice: Subject to any disclaimer, the term of this patent is extended or adjusted under 35 U.S.C. 154(b) by 0 days.

(21) Appl. No.: 11/154,858

(22) Filed: Jun. 16, 2005

(65) Prior Publication Data

US 2005/0288451 A1 Dec. 29, 2005

(30) Foreign Application Priority Data

Jun. 16, 2004 (DE) .................. 10 2004 029 011

(51) Int. Cl.
*C08L 77/00* (2006.01)
*B65D 1/00* (2006.01)

(52) U.S. Cl. .............. 428/36.9; 285/423; 428/36.92; 525/432

(58) Field of Classification Search ........... 525/432; 428/36.9, 36.92; 285/423
See application file for complete search history.

(56) References Cited

U.S. PATENT DOCUMENTS

| | | | |
|---|---|---|---|
| 4,603,166 A | | 7/1986 | Poppe et al. |
| 4,831,108 A | | 5/1989 | Richardson et al. |
| 4,981,920 A | * | 1/1991 | Terashima et al. ........... 525/397 |
| 5,071,924 A | * | 12/1991 | Koch et al. ................. 525/432 |
| 5,098,940 A | | 3/1992 | Brooks |
| 5,302,691 A | | 4/1994 | Soelch |
| 5,469,892 A | | 11/1995 | Noone et al. |
| 5,708,125 A | | 1/1998 | Liedloff et al. |
| 5,852,165 A | * | 12/1998 | Tsumiyama et al. ........ 528/332 |
| 6,506,830 B1 | | 1/2003 | Bussi et al. |

FOREIGN PATENT DOCUMENTS

| | | |
|---|---|---|
| DE | 32 27 858 C2 | 9/1989 |
| DE | 40 60 870 C1 | 7/1991 |
| DE | 92 03 865.4 U1 | 11/1992 |
| DE | 43 29 676 | 3/1994 |
| DE | 38 43 995 C2 | 6/1997 |
| DE | 692 25 946 T2 | 2/1999 |
| DE | 101 10 964 A1 | 12/2001 |
| EP | 0 449 466 | 10/1991 |
| EP | 0 532 963 A2 | 3/1993 |
| EP | 0 693 515 A1 | 7/1995 |
| EP | 0 550 315 | 3/1996 |
| EP | 0 360 611 | 11/1996 |
| EP | 0 550 314 | 11/1996 |
| EP | 0 693 515 | 12/1998 |
| EP | 1 077 341 A2 | 2/2001 |
| EP | 1 245 640 A1 | 10/2002 |
| EP | 0 849 746 B1 | 12/2002 |
| JP | 07-308996 | 11/1995 |
| WO | WO/90/02017 | 3/1990 |
| WO | WO/92/10525 | 6/1992 |
| WO | WO/95/01369 | 1/1995 |
| WO | WO/99/16829 A1 | 4/1999 |

OTHER PUBLICATIONS

Henkel Corporation, Chemical Group, *EMPOL Dimer and Polybasic Acids*, Job 581880-BCou96, Feb. 1997.

* cited by examiner

*Primary Examiner*—Ana Woodward
(74) *Attorney, Agent, or Firm*—Marshall & Melhorn LLC

(57) ABSTRACT

The invention relates to a polymer mixture of partially crystalline aliphatic polyamides and partially aromatic polyamides, the proportion of aliphatic polyamides being more than 50% by weight and the quantitative ratio of the aliphatic carbon atoms to amide bonds in the aliphatic polyamides being in the range of 8:1 to 12:1 and the partially aromatic polyamides, which are present in deficit, having, in addition to hexamethyleneterephthalamide (6T) units, further partially aromatic and/or aliphatic amide units and being predominantly partially crystalline. The invention relates furthermore to the use of polymer mixtures of this type for various application fields, in particular for express couplings or connectors for fuel lines.

8 Claims, No Drawings

POLYMER MIXTURE OF ALIPHATIC POLYAMIDES AND PARTIALLY AROMATIC POLYAMIDES, MOULDED ARTICLES THEREOF AND USE THEREOF

BACKGROUND OF THE INVENTION

1. Field of the Invention

The present invention relates to mixtures of partially crystalline aliphatic polyamides and partially aromatic polyamides, the proportion of aliphatic polyamides being more than 50% by weight, the quantitative ratio of the aliphatic carbon atoms to amide bonds in the aliphatic polyamides being in the range of 8:1 to 12:1 and the partially aromatic polyamides, which are present in deficit, having, in addition to hexamethyleneterephthalamide (6T) units, further partially aromatic and/or aliphatic amide units and being predominantly partially crystalline.

In addition, the invention relates to moulded articles thereof and also the use of these mixtures for producing express couplings or connectors for fuel lines, for fuel filter housings, tank filling connections and vent lines, and also as layer material for single and multi-layer fuel lines.

For producing fuel lines for automotive vehicles, polyamide 11 or 12 have been used practically exclusively for decades. These polyamides were initially processed into simple mono-pipes, which nevertheless soon no longer fulfilled demands due to their high fuel permeability and were replaced by multi-layer automotive vehicle pipelines. Lines of this type have a high thermal loadability, high longitudinal stability and low permeability not only for the main components of the transported fuels, but also for additives and other components which are present therein.

2. Discussion of Related Art

Such lines are described for example in DE 40 06 870 C1, DE 101 10 964 A1, EP 1 077 341 A2, in the German utility model G 92 03 865.4 U1, in U.S. Pat. No. 5,469,892 or in the Japanese published document JP 07-308996. The generality of all the technical solutions, which are proposed there and in further patents, resides in the fact that the pipes are normally constructed at least from three layers which assume different functions. One of these layers functions as a barrier layer and comprises in some cases polymers other than polyamide, for example ethylene/vinyl alcohol copolymers or fluoropolymers which have been made electrically conductive. Furthermore, adhesive layers can be present, if for example the inner layer is not compatible with the barrier layer. Sour gas resistance is required of the inner layer, i.e. high resistance to petrol containing peroxide. The outer layer must finally be mechanically stable, wear-resistant and resistant to zinc chloride.

The possibilities which are offered of improving the properties of fuel lines by the combination of different polymer materials in a composite material are generally not given with material-side optimisation of express couplings or connectors which connect hose or pipelines. Express couplings of this type, as have long proved to be outstanding in practical use, are described for example in DE 37 27 858 C2 and in DE 38 43 995 C2. As a result of the otherwise very expedient construction of these express couplings, it is absolutely impossible to manufacture these from more than one material. Since again only polyamide 11 or 12 are possible for the production thereof, significantly higher fuel permeation through these express couplings must be taken into account, compared to multi-layer pipelines. There has been no lack of attempts to rectify this defect. One of these designs for a new configuration of express couplings is known generally as mono-sandwich technology, a method in which a second material is added in the core region of the connector. This method is however comparatively complex, process control is difficult and can only be mastered by well-trained operators and, in addition, the processing machine is also dearer than a conventional injection moulding machine.

Mixtures of partially aromatic polyamides and aliphatic polyamides are known from patent literature. Thus EP 0 849 746 B1, which relates to the preparation of thermoplastically mouldable magnetic materials, claims "Method for producing a thermoplastically processible moulding compound made of a) 70 to 99% by weight of a partially aromatic copolyamide with a proportion of aliphatic dicarboxylic acids of less than 50% by mol of the entire acid monomers and a melting point of more than 280° C., and b) 1 to 30% by weight of an aliphatic polyamide or copolyamide with, on a statistical average, at least 10 $CH_2$ groups per —NHCO group". The aliphatic polyamide is hence present in deficit.

A similar polyamide mixture, in which the aliphatic polyamide is contained in deficit, is known from EP 1 245 640 A1.

BRIEF SUMMARY OF THE INVENTION

It is therefore an object of the present invention to provide materials, having fuel permeation which is reduced in comparison to polyamide 11 or 12, for the production of express couplings which are simple to produce but also of other parts in automotive vehicles which conduct fuels, and also moulded articles for this purpose.

This object can be achieved with mixtures of partially crystalline aliphatic polyamides and partially aromatic polyamides, the proportion of aliphatic polyamides being more than 50% by weight, the quantitative ratio of the aliphatic carbon atoms to amide bonds in the aliphatic polyamides being in the range of 8:1 and 12:1 and the partially aromatic polyamides which are present in deficit, having, in addition to hexamethyleneterephthalamide (6T) units, further partially aromatic and/or aliphatic amide units and being predominantly partially crystalline.

In the case of the partially crystalline aliphatic polyamides there are preferred polyamide 12, or polyamide 11 or polyamide 1212 or polyamide 1012 or polyamide 1210 or polyamide 13X or polyamide 9X, wherein X means an integer from 9-13, or any arbitrary mixture of these polyamides. These polyamides are produced according to known methods by polycondensation of the relevant diamine/dicarboxylic pairs or of the T-aminocarboxylic acids in the case of polyamide 11 and 12. The latter is produced predominantly by ring-opening polymerisation of laurinlactam.

The molecular weight of the aliphatic polyamides can be controlled of course by mono- or difunctional chain regulators, such as benzoic acid, adipinic acid or hexamethylene diamine. In addition, they can contain small quantities of further monomer units as long as no impairment of their properties emanates from the latter.

The partially aromatic, predominantly partially crystalline polyamides, in addition to the hexamethyleneteraphthalamide (6T) units, can contain further partially aromatic and/or aliphatic units.

As disclosed herein, the following partially aromatic polyamides are particularly preferred:

Partially crystalline polyamide 6T/6I with at least 52% by mol hexamethyleneterephthalamide units and up to 48% by mol hexamethyleneisophthalamide units.

Mixtures of amorphous polyamide 6T/6I with at most 40% by mol hexamethyleneterephthalamide units and at least 60% by mol hexamethyleneisophthalamide units and an excess of partially crystalline polyamide 6T/6I with at least 52% by mol hexamethyleneterephthalamide units.

Partially crystalline polyamide 6T/66 with at most 90% by mol hexamethyleneadipamide (66) units.

Partially crystalline ternary polyamide 6T/6I/66 with at least 30% by mol hexamethyleneterephthalamide units and at most 65% by mol hexamethyleneadipamide (66) units.

Partially crystalline ternary PA 6T/6I/X with at least 50% by mol hexamethyleneterephthalamide units and at most 28% by mol aliphatic units of the formula —NH—$(CH_2)_{X-1}$—CO—, wherein X is equal to 11 or 12.

Partially crystalline ternary PA 6T/66/12 with at least 15% by mol hexamethyleneterephthalamide (6T) units and at most 80% by mol hexamethyleneadipamide (66) units.

Partially aromatic and partially crystalline polyamide which contains up to 26% by mol aliphatic units which can be produced by condensation of dimerised fatty acids with up to 44 carbon atoms and hexamethylene diamine.

DESCRIPTION OF THE PREFERRED EMBODIMENT

The production of partially crystalline, partially aromatic polyamides of this type, the DSC melting temperatures of which extend from 270 to 330° C., extends over two steps. The pre-condensate production can be implemented for example according to the method described in U.S. Pat. No. 5,708,125, the post-condensation of the melt in a twin-screw extruder which corresponds inter alia to the method described in U.S. Pat. No. 4,831,108. Since only a dwell time of less than 5 minutes is available for the post-condensation in the extruder, the pre-condensates must contain a catalyst which accelerates the amidation. Phosphorous compounds are generally used for this purpose, such as for example sodium hypophosphite monohydrate, which are added already to the aqueous solution of monomers for the sake of simplicity. In addition, when producing partially aromatic polyamides with —NH—$(CH_2)_{X-1}$—CO— units, it should be noted that either the corresponding T-aminocarboxylic acids, i.e. T-aminolauric or T-aminoundecanoic acid or the corresponding lactams, such as laurinlactam, can thereby be used. In the case of amino acids, the known methods can be applied during production of the corresponding pre-condensates, but if commencing with lactam, then the conditions must be chosen such that the ring opening is extensively terminated already before or in the initial phase of the pre-condensate stage. This can be achieved for example in that an aqueous solution of monomers with a deficit of hexamethylene diamine is kept under pressure in an autoclave for 2-6 hours at approx. 200° C. Due to the acid excess in conjunction with the large water quantity, the ring opening of the lactam is adequately accelerated. At the end of this phase, the missing diamine is added metered against the pressure prevailing in the container. Thereafter, the pre-condensate production is brought to an end as normal. A possibility for ring opening which is comparable in principle resides in the fact that the lactam is caused to react in advance with a large quantity of a carboxylic acid, such as for example terephthalic acid, and the diamine required in total and the remaining dicarboxylic acid(s) is added together with the water after termination of the acidolysis and the reaction mixture is brought to equilibrium by transamidation.

The dimerised fatty acids used here are obtained from monomer unsaturated fatty acids with normally 18 carbon atoms by means of a specific oligomerisation reaction. As a result of this reaction, also smaller quantities of the trimerised fatty acid are produced in addition to an unsaturated dimerised quantity. By means of subsequent catalytic hydration, the C—C double bonds can be removed. The term "dimerised fatty acid" relates to both types of these dicarboxylic acids, saturated and unsaturated. Details relating to the structure and the properties of the dimerised fatty acids are found in the corresponding pamphlet "Pripol $C_{36}$-dimer acid" of the company UNICHEMA (Emmerich, D) or in the brochure of the firm COGNIS (Düsseldorf, D) "Empol Dimer and Polybasic Acids; *Technical Bulletin* 114C (1997)". For the production of polyamides, dimerised fatty acids with a content of trimerised fatty acids of at most 3% by weight are used. Starting from unsaturated fatty acids with 22 carbon atoms, corresponding dimer acids with 44 carbon atoms are available.

With the exception of the products modified with dimerised fatty acids, all the partially aromatic polyamides used to produce the mixtures according to the invention are known. These products, for which the generally accepted term "polyterephthalamides" has been adopted in the meantime, are described in detail—in part however also the methods for production thereof—in numerous patent specifications, for example in U.S. Pat. Nos. 4,603,166, 4,831,108, 5,098, 940, 5,302,691, WO 90/02017, WO 92/10525, WO 95/01389, EP-PS 0 360 611, EP-PS 0 449 466, EP-PS 0 550 314, EP-PS 0 550 315, EP-PS 0 693 515 and DE-PS 43 29 676.

In the case of the polymer mixture according to the invention, it is now essential that, in contrast to EP 1 245 640 A1 and EP 0 849 746 B1, the partially aromatic polyamides are present in deficit in the mixtures according to the invention. The aliphatic polyamides predominate in their mass and—because of their smaller density—even more in their volume. As a rule, it can be expected of such polymer mixtures that the excess component forms the matrix and the second polymer is dispersed therein. Furthermore, in such mixtures normally the excess component determines the mechanical and thermal properties. Both effects are desired in the mixtures according to the invention and are deliberately produced by the choice of the mixture ratio of the components.

Furthermore, the invention relates to moulded articles which have been produced from the polymer mixture described in more detail previously. Surprisingly, it was shown that these moulded articles, in comparison with moulded articles which were produced from pure aliphatic matrix polyamides, have a significantly reduced fuel permeability. Examples of moulded articles of this type are: express couplings or connectors for fuel lines, fuel filter housings, tank filling connections, vent lines, and also layer material for single and multi-layer fuel lines, and other parts which come into contact with fuels.

The mixtures according to the invention can contain further additives. They can contain fibre- or particle-shaped fillers. There are used as fillers, in particular glass fibres in the form of rovings or short glass fibres. However, also carbon fibres, metal fibres, polymer fibres, glass balls, glass powder or mineral materials, such as talc, chalk, kaolin and mica, wollastonite and other silicates (e.g. laminated silicates for nanocomposites) can be used. Furthermore, the mixtures according to the invention can contain carbon black, which is particularly well suited for increasing weathering stability. Of course, normal stabilisers can be added as further components, such as antioxidants and UV-protectants, lubricants, colourants, etc.

The above-mentioned applications of the mixtures according to the invention in automotive vehicles demand as low as possible an electrostatic charging of the relevant parts. This is achieved by the addition of means which increase electrical conductivity, such as e.g. carbon black and/or graphite filaments. Specific nanotubes—hollow fibres made of carbon with the smallest diameters and an extremely great length—have recently proved to be particularly suitable for this purpose. The quantities of reinforcing agents, fillers, processing aids, stabilisers and other additives to be chosen are known to the person skilled in the art.

There can be added to the mixtures according to the invention, in order to increase their impact strength and notch impact strength, polyolefins which are provided with polar groups, such as e.g. carboxyl groups or anhydride radicals, e.g. correspondingly functionalised polyethylenes (LDPE, LLDPE), ethylene/propylene (EPM) copolymers, ethylene/1-butene-copolymers, EPDM and others. Also ionomers, which concern ethylene copolymers with carboxyl and carboxylate groups, fulfil this purpose. The quantity of such polyolefins and copolyolefins should be kept low—for instance between 3 and 15% by weight—if the fuel permeability is intended not to be impaired too greatly.

In order to produce the moulding compounds according to the invention, single and preferably twin-screw extruders, which have a suitable arrangement of conveying and kneading elements, can be used. Fillers, such as e.g. glass fibres, are supplied to the melt mixture of the polymers by means of a separate metering device. The melt temperature during mixing (=compounding) of the components in the extruder must be above the melting point of the partially aromatic polyamide. All the mixtures have a two or multi-phase morphology, which emerges unequivocally from measurements by means of DSC (Differential Scanning Calorimetry). The mixtures according to the invention are used to produce moulded articles for automotive vehicles. Because of their favourable properties with respect to fuel permeability, preferred applications are moulded articles for parts which conduct fuel and/or come in contact with fuel. The moulded articles are produced therefrom according to known methods for moulding polymer melts by injection moulding, extrusion and other shaping techniques. In the case of these moulding processes, the melt temperature, in contrast to the compounding process, can also be below the melting point of the partially aromatic polyamide. When injection moulding the plates, the melting temperature in all cases was 260° C. In three examples, the effect of the processing temperature (=material temperature) on the fuel permeation was investigated, additional test bodies being produced at 285° C. material temperature.

The following examples explain the invention without limiting it however.

EXAMPLES a) Determination of the Physical and Chemical Properties:

The solution viscosity of the used polyamide 12, of pre-condensate and finished copolyamide was determined in a 0.5% by weight solution in m-cresol at 20° C. The determination of the end group concentrations was effected by means of acidimetric titration. The amino end groups were titrated in m-cresol/isopropanol 2:1 (parts by weight) as solvent with 0.1 normal ethanolic perchloric acid. The titration of the carboxyl end groups was effected in an ortho cresol/benzyl alcohol mixture as solvent with 0.1 normal tert-butylammoniumhydroxide.

The DSC measurements were implemented with the appliance of the company TA Instruments, Universal V2.3C type.

In order to measure the fuel permeation, the permeation rate of a reference petrol through a plate with 1 mm thickness and strip casting at 60° C. is measured according to the following method: An aluminium shell (8 cm diameter, 2 cm depth) is filled with the reference petrol approx. up to the halfway mark. The shell is covered with the sample plate and this is screwed tightly shut. The total weight (shell, petrol, test plate) is weighed and the sample is placed in a circulating air oven at 60° C. (+−2° C.). According to the speed of the permeation, the total weight is re-measured from time to time until it is established that this has dropped regularly and hence a constant permeation rate is achieved. The permeation rate is calculated in $g/m^{2*}24\,h$ from the weight loss per unit time and from the surface area of the sample. A double determination is always implemented. As reference petrol *CEC Legislative Fuel RF*-08-A-85 was used, which was produced and marketed by the company Haltermann GmbH in Hamburg (D).

b) Codes for the Polymers and Additives Which are Used

A: Polyamide 12: heat-stabilised polyamide 12, by incorporation of a heat stabiliser in Grilamid® L22A, an amino-controlled, highly viscous polyamide 12 with a relative viscosity of 2.1 and an $NH_2$ or COOH end group concentration of 56 or 10 meq/kg. (production and marketing of Grilamid® L22A EMS-Chemie AG; Domat/Ems (CH)).

B: Grivory® HT XE 3733 NK: polyamide 6T/6I with 70% by mol hexamethyleneterephthalamide and 30% by mol hexamethyleneisophthalamide units, a relative viscosity of 1.55 and a DSC melting point of approx. 325° C. (production and marketing by EMS-Chemie AG (CH)).

C: Grivory® HT XE 3774 NK: polyamide 6T/66 with 55% by mol hexamethyleneterephthalamide and 45% by mol hexamethyleneadipamide units, a relative viscosity of 1.76 and a DSC melting point of 310° C. (production and marketing by EMS-Chemie AG (CH)).

D: Grivory® G21: amorphous polyamide 6I/6T with 67% by mol hexamethyleneisophthalamide and 33% by mol hexamethyleneterephthalamide units and a relative viscosity of 1.53 (production and marketing by EMS-Chemie AG (CH)).

E: Polyamide 6T/6I/12: with 62% by mol hexamethyleneterephthalamide, 15% by mol hexamethyleneisophthalamide units and 23% by mol units of the formula —NH—$(CH_2)_{11}$—CO—; a relative viscosity of 1.660 and a DSC melting point of 306° C.

F: Polyamide 6T/66/12: with 46% by mol hexamethyleneterephthalamide, 46% by mol hexamethyleneadipamide units and 8% by mol units of the formula —NH—$(CH_2)_{11}$—CO—; a relative viscosity of 1.678 and a DSC melting point of 289° C.

G: Surlyn 9020: Ionomer (zinc-type) (production and marketing by Du Pont).

H: Antioxidant based on CuI and KI.

J: Adhesive Tween20.

c) Production of the Partially Aromatic Polyamides E and F

Both products were produced according to a multiple stage method. The production of the pre-condensate was implemented according to the method described in U.S. Pat. No. 5,708,125, the post-condensation in the melt corresponded inter alia to the method described in U.S. Pat. No. 4,831,108.

In the first step, an aqueous solution of the components is produced firstly at 190° C. with 29% by weight water in an agitated pressure vessel (V=20 l) which is able to be made inert with nitrogen. Agitation takes place for two hours at this temperature until a pressure of approx. 1.0 MPa has been set. After completion of this step, the solution is withdrawn from the recipient vessel under pressure into a 20 l agitation autoclave and is heated there to 260° C., the pressure being maintained at 3.3 MPa by repeated opening of a gas discharge valve. As soon as the pressure remains constant after approximately 2 hours—also without further actuation of the valve, the base valve is opened and the pre-condensate solution is withdrawn and sprayed into a cyclone. A large part of the water is evaporated thereby and irregularly shaped particles of the relevant pre-condensate remain, which are dried in a vacuum at 80° C. and subsequently are ground into a powder.

In order to produce the high molecular copolyamides, the pre-condensates in the melt are post-condensed in a parallel twin-screw extruder of the ZSK 25 type (product of the company Werner & Pfleiderer; Stuttgart, D) under the following conditions. The highly viscous polymer melt is withdrawn as a strand, cooled and granulated.

pre-condensate metering and throughput: 4 kg/h
screw speed: 100 rpm
Temperatures (zone 1-12): 0/40/100/300/350/370/370/ 370/370/370/360/330 and 330° C.
degassing: zone 10 and zone 11 under $N_2$
drying of the granulate: 24 hours at 100° C. in a vacuum For the production of each of the two polyamides, 3 pre-condensate batches of respectively approx. 7 kg were produced and these were mixed before the post-condensation. The results of the analyses on the pre-condensate batches and on the finished polymers are found in Table 3. Table 1 shows the abbreviations which were used.

TABLE 1

| | Abbreviations |
|---|---|
| TPA | Terephthalic acid |
| HMD | Hexamethylene diamine |
| IPA | Isophthalic acid |
| ADA | Adipinic acid |
| ALA | T-aminolauric acid |
| BZA | Benzoic acid |
| SHP | Sodium hypophosphite ($NaH_2PO_2$ monohydrate) |
| SW | Soft water |
| RV | Relative solution viscosity in 0.5% solution in m-cresol at 20° C. |
| [C] | Carboxyl end group concentration in meq/kg |
| [A] | Amino end group concentration in meq/kg |
| MP | DSC melting point (0° C.) |

TABLE 2

Formulations

Raw materials [g]

| Polyamide | TPA | IPA | ADA | HMD*) | ALA | BZA | SHP | SW |
|---|---|---|---|---|---|---|---|---|
| E | 2791 | 658 | — | 2425 | 1310 | 28 | 2.1 | 3300 |
| F | 1990 | — | 1749 | 2923 | 448 | 26 | 2.1 | 2350 |

*)respectively 2% excess

In Table 4, the results of the permeation measurements on the mixtures according to the invention and on the comparison products are listed. The mixtures were produced with a twin-screw extruder of the ZSK 30 type (product of the Company Werner & Pfleiderer; Stuttgart, D). All the products were processed with an injection moulding machine of the NETSTAL Neomat 235/90 Sycap type (product of the company NETSTAL in Näfels (CH)) into 1 mm thick plates with 100 mm edge length and strip casting. The material temperature generally was 260° C., in some cases the plates were also produced at 285° C.

TABLE 3

Relative viscosities, end groups and DSC melting points

| | | Pre-condensate (dried) | | | Polymer | |
|---|---|---|---|---|---|---|
| Polyamide | Batch | RV | [A] | [C] | RV | MP |
| E | 1 | 1.127 | 788 | 812 | 1.660 | 306 |
| | 2 | 1.143 | 900 | 915 | | |
| | 3 | 1.145 | 950 | 962 | | |
| F | 1 | 1.175 | 850 | 720 | 1.678 | 289 |
| | 2 | 1.173 | 913 | 709 | | |
| | 3 | 1.187 | 798 | 680 | | |

In Table 5, the permeation values of the products processed at 260 and 285° C. are tabulated. A significant influence of the material temperature on the fuel permeability is shown above all in products which, in addition to the high melting, partially aromatic polyamide, also contain an amorphous polyamide in the dispersed phase. The permeation there increases sharply with increasing processing temperature, whilst it is hardly influenced by the processing temperature in the case of the product which only contains a high melting, partially aromatic polyamide. Probably this effect can be attributed to the fact that, with an increase in the material temperature, the dispersion of the amorphous meltable component in the polyamide 12 matrix is changed in such a way that smaller particles of the dispersed component coalesce and hence form larger polymer droplets which, relative to the barrier properties of the mixtures, have a reduced effect. A decision cannot be made as to whether these particles comprise predominantly the amorphous partially aromatic polyamide or a mixture of the amorphous and of the partially crystalline, partially aromatic polyamide in a prescribed mixture ratio.

TABLE 4

Fuel permeability of the mixtures at 60° C. [$g/m^2$ * 24 hrs] (Haltermann Reference Petrol CEC Legislative Fuel RF-08-A-85)

Components of the mixtures (parts by weight)

| Example | A | B | C | D | E | F | G | H | J | Permeation |
|---|---|---|---|---|---|---|---|---|---|---|
| Comparison (polyamide 12) | 99.65 | | | | | | | 0.35 | 0.04 | 2.49 |
| 1 | 76.65 | 23 | | | | | | 0.35 | 0.04 | 0.72 |
| 2 | 62.65 | 37 | | | | | | 0.35 | 0.04 | 0.26 |
| 3 | 76.65 | | 23 | | | | | 0.35 | 0.04 | 0.82 |
| 4 | 68.65 | 23 | | | | | 8 | 0.35 | 0.04 | 2.64 |
| 5 | 50.65 | 37 | | | | | 12 | 0.35 | 0.04 | 2.85 |
| 6 | 68.65 | | 23 | | | | 8 | 0.35 | 0.04 | 1.97 |

TABLE 4-continued

Fuel permeability of the mixtures at 60° C. [g/m² * 24 hrs] (Haltermann Reference Petrol CEC Legislative Fuel RF-08-A-85)

| Example | A | B | C | D | E | F | G | H | J | Permeation |
|---------|---|---|---|---|---|---|---|---|---|------------|
| 7 | 50.65 | | 37 | | | | 12 | 0.35 | 0.04 | 0.7 |
| 8 | 69.65 | 30 | | | | | | 0.35 | 0.04 | 0.40 |
| 9 | 62.65 | 25 | | 12 | | | | 0.35 | 0.04 | 0.19 |
| 10 | 62.65 | 20 | | 17 | | | | 0.35 | 0.04 | 0.14 |
| 11 | 62.65 | | | | 38 | | | 0.35 | 0.04 | 0.25 |
| 12 | 52.75 | | | | 46.9 | | | 0.35 | 0.04 | 0.056 |
| 13 | 75 | | | | | 24.65 | | 0.35 | 0.04 | 0.45 |
| 14 | 60 | | | | | 39.65 | | 0.35 | 0.04 | 0.043 |

Examples 4-7 represent impact resistance modified mixtures. The impact resistance modifier is an ionomer. These mixtures demonstrate at the same time the negative effect of the copolyolefin on the fuel permeability.

TABLE 5

Influence of the processing temperature on the fuel permeability at 60° C. [g/m² * 24 hrs]

| Example | Processing temperature [° C.] | Permeation |
|---------|-------------------------------|------------|
| 8 | 260 | 0.40 |
| 8-1 | 285 | 0.39 |
| 9 | 260 | 0.19 |
| 9-1 | 285 | 0.27 |
| 10 | 260 | 0.14 |
| 10-1 | 285 | 0.18 |

German Patent application 10 2004 029 011.3, filed Jun. 16, 2004, from which this application claims priority, is hereby incorporated by reference as if set forth in its entirety herein.

The invention claimed is:

1. Molded articles selected from express couplings which connect hose or pipeline, connectors for fuel lines, fuel filter housings, tank filling connections, vent lines or laminated materials for fuel lines, produced from a polymer mixture comprising:
 a) more than 50% by weight of partially crystalline aliphatic polyamides, wherein the quantitative ratio of the aliphatic carbon atoms to amide bonds in the aliphatic polyamides being in the range of 8:1 to 12:1;
 b) less than 50% by weight of a predominantly partially crystalline mixture of partially aromatic polyamides, having, in addition to hexamethyleneterephthalamide (6T) units, further partially aromatic and/or aliphatic amide units comprising
   i) an amorphous polyamide 6T/6I, which contains at most 40% by mol hexamethyleneterephthalamide units and at least 60% by mol hexamethyleneisophthalamide units; and
   ii) an excess of a partially crystalline polyamide 6T/6I, which contains at least 52% by mol hexamethyleneterephthalamide units and up to 48% by mol hexamethyleneisophthalamide (6I) units;
 wherein the polymer mixture has a reduced fuel permeability in comparison with polyamide 11 or polyamide 12.

2. Molded articles according to claim 1, wherein the aliphatic partially crystalline polyamide a) is selected from polyamide 12, or polyamide 11 or polyamide 1212 or polyamide 1012 or polyamide 1210 or polyamide 13X or polyamide 9X, wherein X means an integer from 9-13, or mixtures thereof.

3. Molded articles selected from express couplings which connect hose or pipeline, connectors for fuel lines, fuel filter housings, tank filling connections, vent lines or laminated materials for fuel lines, produced from a polymer mixture comprising:
 a) more than 50% by weight partially crystalline aliphatic polyamides, wherein the quantitative ratio of the aliphatic carbon atoms to amide bonds in the aliphatic polyamides being in the range of 8:1 to 12:1; and
 b) less than 50% by weight partially aromatic polyamides, being predominantly partially crystalline, having, in addition to hexamethyleneterephthalamide (6T) units, further partially aromatic and/or partially aliphatic amide units, wherein the partially aromatic polyamide is a partially crystalline polyamide 6T/66/12 with at least 15% by mol hexamethyleneterephthalamide units and at most 80% by mol hexamethyleneadipamide (66) units,
 wherein the polymer mixture has a reduced fuel permeability in comparison with polyamide 11 or polyamide 12.

4. Molded articles according to claim 3, wherein the partially aromatic polyamide contains up to 26% by mol aliphatic units which can be produced by condensation of dimerised fatty acids with up to 44 carbon atoms with hexamethylenediamine.

5. Molded articles according to claim 3, wherein the aliphatic partially crystalline polyamide a) is selected from polyamide 12, or polyamide 11 or polyamide 1212 or polyamide 1012 or polyamide 1210 or polyamide 13X or polyamide 9X, wherein X means an integer from 9-13, or mixtures thereof.

6. Molded articles selected from express couplings which connect hose or pipeline, connectors for fuel lines, fuel filter housings, tank filling connections, vent lines or laminated materials for fuel lines, produced from a polymer mixture comprising:
 a) more than 50% by weight partially crystalline aliphatic polyamides, wherein the quantitative ratio of the aliphatic carbon atoms to amide bonds in the partially crystalline aliphatic polyamides being in the range of 8:1 to 12:1; and
 b) less than 50% by weight partially aromatic polyamides, being predominantly partially crystalline, having, in addition to hexamethyleneterephthalamide (6T) units, further partially aromatic and/or partially aliphatic amide units, wherein the partially aromatic polyamide is a partially crystalline polyamide 6T/6I/X with at least 50% by mol hexamethyleneterephthalamide units and at most 28% by mol aliphatic units of the formula X=—NH—(CH$_2$)$_{x-1}$—CO—, wherein x is equal to 11 or 12, wherein the polymer mixture has a reduced fuel permeability in comparison with polyamide 11 or polyamide 12.

7. Molded articles according to claim 6, wherein the partially aromatic polyamide contains up to 26% by mol aliphatic units which can be produced by condensation of dimerised fatty acids with up to 44 carbon atoms with hexamethylenediamine.

8. Molded articles according to claim 6, wherein the aliphatic partially crystalline polyamide a) is selected from polyamide 12, or polyamide 11 or polyamide 1212 or polyamide 1012 or polyamide 1210 or polyamide 13X or polyamide 9X, wherein X means an integer from 9-13, or mixtures thereof.

* * * * *